United States Patent [19]

Sakamoto

[11] Patent Number: 4,642,757
[45] Date of Patent: Feb. 10, 1987

[54] MICROINSTRUCTION CONTROLLED ARITHMETIC CONTROL UNIT

[75] Inventor: Tsutomu Sakamoto, Tokyo, Japan

[73] Assignee: Tokyo Shibaura Denki Kabushiki Kaisha, Kawasaki, Japan

[21] Appl. No.: 484,260

[22] Filed: Apr. 12, 1983

[30] Foreign Application Priority Data

Apr. 20, 1982 [JP] Japan ................... 57-65821

[51] Int. Cl.[4] ............................................. G06F 9/30
[52] U.S. Cl. .................................................. 364/200
[58] Field of Search ... 364/200 MS File, 900 MS File

[56] References Cited

U.S. PATENT DOCUMENTS 3,656,123  4/1972  Carnevale et al. .............. 364/200
4,077,060  2/1978  Bodner et al. ................... 364/200

FOREIGN PATENT DOCUMENTS 1278103  6/1972  United Kingdom .
1318231  5/1973  United Kingdom .
1581650  12/1980  United Kingdom .

OTHER PUBLICATIONS

Variable-cycle length clock with realtime length control, F. A. Zurla, IBM Technical Disclosure Bulletin, vol. 16, No. 7, pp. 2163-2165, Dec. 1973.

Primary Examiner—David Y. Eng
Attorney, Agent, or Firm—Kenyon & Kenyon

[57] ABSTRACT

A microinstruction-controlled arithmetic control unit including an inhibiting circuit enables prohibition, when parallel operation is not possible in the same cycle, of the execution of the succeeding microinstruction by the inhibiting circuit without the insertion of dummy microinstructions, and permits parallel operation, when parallel operation is possible in the same cycle, by releasing the function of the inhibiting circuit, thereby improving the operation speed.

3 Claims, 24 Drawing Figures

F I G. 5
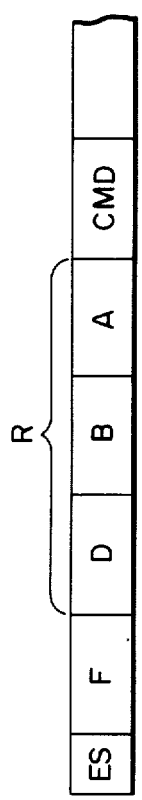
F I G. 7
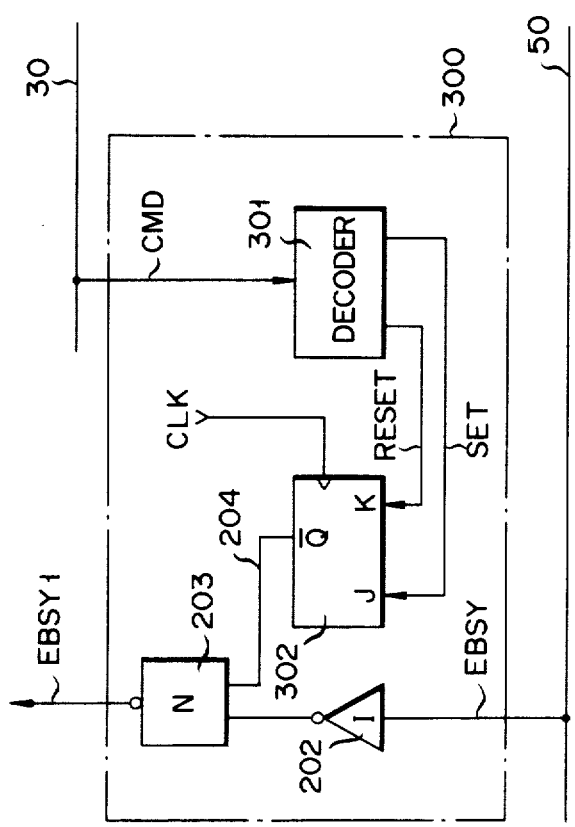

FIG. 6A CLK

FIG. 6B CONTENTS OF MICRO-INSTRUCTION BUS

FIG. 6C EBSY

FIG. 6D CLK1

FIG. 6E CLK2

FIG. 6F EBSY1

FIG. 6G LINE 204

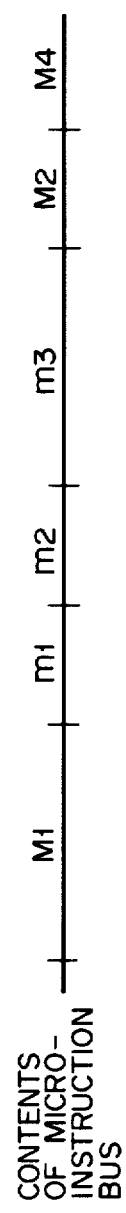
FIG. 8A CLK
FIG. 8B CONTENTS OF MICRO-INSTRUCTION BUS
FIG. 8C EBSY
FIG. 8D CLK1
FIG. 8E CLK2
FIG. 8F EBSY1
FIG. 8G LINE 204

MICROINSTRUCTION CONTROLLED ARITHMETIC CONTROL UNIT

BACKGROUND OF THE INVENTION

The present invention relates to an arithmetic control unit which is provided with a plurality of processing elements having their own arithmetic functions, each processing element being operated in accordance with a microinstruction.

A conventional arithmetic control unit is shown in FIG. 1. A control section 10 is provided with a control storage 11 and various registers. The processing elements $20_1, 20_2, \ldots, 20_n$ have their own arithmetic functions. The processing elements $20_1, 20_2, \ldots, 20_n$ perform multiplication, fixed point addition/subtraction, and floating point addition/subtraction. The microinstruction bus 30 transfers a microinstruction read out from the control storage 11 in the control section 10. A data bus 40 transfers data from the registers in the control section 10 to the processing elements $20_1, 20_2, \ldots, 20_n$, or transfers the operation results of the processing elements $20_1, 20_2, \ldots, 20_n$ to the registers in the control section 10. The data bus 40 actually comprises a data bus for the transfer of the operation result and a data bus for the transfer of source data, but is shown in a single line in the figure for the sake of simplicity. An element busy line 50 (hereinafter referred to as an EBSY line) is a transfer path of an element busy signal (hereinafter referred to as a signal EBSY) produced from the corresponding processing element $20_i$ ($i=1, 2, \ldots, n$) when a plurality of clock signals (system clock signals) are required for the processing of a single microinstruction in the processing elements $20_i$ ($i=1, 2, \ldots, n$). The signal EBSY is an inhibit signal for inhibiting the execution of the succeeding microinstruction and is transferred to the control section 10 through the EBSY line 50.

FIG. 2 shows interconnections of the control section 10 and the processing element $20_i$ ($i=1, 2, \ldots, n$) in FIG. 1. The microinstruction read out from the control storage 11 in the control section 10 is temporarily stored in an A microinstruction register 12 (hereinafter referred to as a MIRA) in response to a first timing clock signal CLK1 synchronized with the system clock signal CLK. Then, the microinstruction stored in the MIRA12 is output to the microinstruction bus 30. A register file 13 in which various data such as operation results are stored is provided in the control section 10. The designation of a register in the register file 13 is performed by the content of the predetermined field of the microinstruction which is output to the microinstruction bus 30. Then, the content of the register which is designated by the above microinstruction is output onto the data bus 40 from the register file 13. Furthermore, the microinstruction on the microinstruction bus 30 is distributed to individual processing elements $20_i$ ($i=1, 2, \ldots, n$).

A decoding section $21_i$ is provided in the processing elements $20_i$ for decoding the microinstruction which is distributed through the microinstruction bus 30. The decoding section $21_i$ decodes the microinstruction (or a part of the microinstruction) from the microinstruction bus 30 to detect that the corresponding processing element $20_i$ has been selected. Then the decoding section $21_i$ provides the microinstruction (or the specified field of the microinstruction) to a B microinstruction register $22_i$ (hereinafter referred to as a MIRB) and prohibits the succeeding input of the microinstruction from the microinstruction bus 30. This prohibition is cleared at the completion of the previous microinstruction execution. The microinstruction from the decoding section $21_i$ is stored in the MIRB$22_i$ in response to the system clock signal CLK. At the same time, data on the data bus 40 are input to an arithmetic and logic unit $23_i$.

As apparent from the functions of the processing elements $20_1, 20_2, \ldots, 20_n$, the processing element $20_1$ comprises a multiplier, the processing element $20_2$ comprises an adder and the processing element $20_n$ comprises an adder and a shifter. The content of the MIRB $22_i$ is output to the control circuit $24_i$ to perform a mode designation for the arithmetic and logic unit $23_i$ and the sequence control of the operation. The operation result from the arithmetic and logic unit $23_i$ is output onto the data bus 40. The data (operation result) on the data bus 40 is stored in the specified register in the register file 40 designated by the specified field of the microinstruction (on the microinstruction bus 30). Now the corresponding operation for one microinstruction is completed.

On the other hand, if the operation of the arithmetic and logic unit $23_i$ is not completed within a single clock period (one system clock), the signal EBSY (effective at logical "0") is output onto the EBSY line 50 from the control circuit $24_i$. The signal EBSY on the EBSY line 50 is supplied to an inhibiting circuit 14 within the control section 10. A first inhibiting gate 15 for inhibiting the output of a first timing clock signal CLK1 for storing the microinstruction and a second inhibiting gate 16 for inhibiting the output of a second timing clock signal CLK2 for writing data in the register file are provided in the inhibiting circuit 14. The first inhibiting gate 15 is, for example an AND gate to control the system clock signal CLK, the signal EBSY used for the inhibition control and a signal 17 (which is actually a memory busy signal whose description is omitted for the sake of simplicity, since it is not directly related to the present invention). The AND gate 15 inhibits the system clock signal CLK to be output to the MIRA12 as the first timing clock CLK1 during the period when either the signal EBSY and/or the signal 17 is effective (logical "0"). Accordingly, when the signal EBSY of logical "0" is output onto the EBSY line 50 from the control circuit $24_i$ of the processing element $20_i$, the supplement of the first timing clock signal CLK1 to the MIRA12 is inhibited by the first inhibiting gate 15. Therefore, the microinstruction fetch to the MIRA12 is prohibited, that is the execution of the microinstruction is prohibited. The second inhibiting gate 16 is, for example, an AND gate which receives the system clock signal CLK, the signal EBSY and a signal 18 which is a decoded signal of a so-called DNULL which designates information for prohibiting the storage of the operation result, i.e., a destination, into the register file 13. The second inhibiting gate inhibits the system clock signal CLK to be output to the register file 13 as a second timing clock signal CLK2 during the period when at least one of the signals EBSY or 18 is effective (logical "0").

FIGS. 3A through 3E are timing charts showing the above prior art operation, wherein a microinstruction M1, a microinstruction M2 and a microinstruction M3 are sequentially executed. The microinstruction M1 is, for example a multiplication instruction which requires a plurality of clock signals for the operation. The DNULL information described above is designated in the microinstruction M1 so that the multiplication result is not stored in the register file 13. In this example, the multiplication result is stored in the register file 13 in accordance with the command of the microinstruction M2. As is apparent from the above description, when the microinstruction M1 which requires a plurality of clock signal is executed, the effective signal EBSY is produced from the control circuit $24_i$ of the corresponding processing element $20_i$. In this example, the signal EBSY is produced from the control circuit of the processing element $20_1$ for example, which has the multiplication function. The signal EBSY is continuously produced during the execution of the microinstruction M1. When the microinstruction M1 requires 6 clock signals (clock signal 1 through clock signal 6), the prohibiting functions of the first and second gates 15, 16 of the inhibiting circuit 14 are performed during the period of 6 clock signals. As a result, as shown in FIG. 3D, the output of the first timing clock signal CLK1 is inhibited and the storage of the succeeding microinstruction M2 read out from the control storage 11 into the MIRA 12 is prohibited. That is, the execution of other microinstructions is prohibited by the function of the inhibiting circuit under the control of the signal EBSY. At the clock signal 6, by which time the processing of the microinstruction M1 is completed, the control circuit $24_i$ sets the signal EBSY to logical "1". Then the first inhibiting gate is released from the inhibiting condition and produces the first timing clock signal CLK1 again at the clock signal 7 and so on. On the other hand, the decode signal 18 corresponding to the DNULL information designated in the microinstruction M1 is input to the second inhibiting gate 16. Therefore, the gate 16 is released from the inhibiting condition and produces the second timing clock signal CLK2 at the clock signal following the clock signal 7 at which next microinstruction M2 is executed.

As apparent from the above description, in the prior art arithmetic control unit, the inhibiting circuit 14 functions under the control of the EBSY signal to prohibit the execution of the succeeding microinstruction during the execution of the microinstruction which requires a plurality of clock signals. This function is effective where the succeeding microinstruction uses the execution result of the microinstruction which requires a plurality of clock signals. To prohibit the execution of the succeeding microinstruction during the execution of the microinstruction which requires a plurality of clock signals, it is also useful to insert some dummy microinstructions, for example a no operation (NOP) microinstruction after the microinstruction which requires a plurality of clock signals. This method eliminates the inhibiting circuit 14. However, a disadvantage might be caused in that the capacity of the control storage 11 must increase since the dummy instructions have to be stored in a plurality of locations in the control storage 11.

As has been described, the prior art arithmetic control unit is so constructed that the inhibiting circuit 14 functions to inhibit the execution of the succeeding microinstruction during the execution of the microinstruction which requires a plurality of clock signals. Therefore, it has successfully avoided obtaining an erroneous operation result caused by the execution of the succeeding microinstruction during the execution of the microinstruction which requires a plurality of clock signals without using dummy instructions in a plurality of locatibns of the control storage 11, that is without increasing the capacity of the control storage 11.

However, the prior art system has a significant drawback in that the succeeding microinstruction is absolutely prohibited during the execution of the microinstruction which requires a plurality of clock signals by the inhibiting circuit 14 even if the parallel operation of the two microinstructions can be performed in the same cycle. This disadvantage obstructs the effective use of other processing elements and precludes high speed operation of the system.

SUMMARY OF THE INVENTION

The present invention has been created in view of the above drawbacks, and its object is to provide an arithmetic control unit which, when parallel operation is not possible in the same cycle, enables prohibition of the execution of the succeeding microinstruction by the inhibiting circuit without the insertion of dummy microinstructions, and when parallel operation is possible in the same cycle, permits parallel operation by releasing the function of the inhibiting circuit, thereby improving the operation speed.

To achieve the above object, there is provided a microinstruction-controlled arithmetic control unit, comprising: a clock generator for generating a reference clock signal for the arithmetic control unit; control storage means for storing microinstructions; a microinstruction bus for transferring the microinstructions; a data bus for transferring a data; a microinstruction register for storing, through said microinstruction bus, the microinstruction read out from said control storage means in response to a first timing clock signal synchronized with the reference clock signal; a data register for storing the data on said data bus in response to a second timing clock signal synchronized with the reference clock signal; a plurality of processing elements for performing an arithmetic operation specified by the microinstruction on said microinstruction bus and data on said data bus and for producing a prohibition signal so as to prohibit the execution of the succeeding microinstruction during the execution of a microinstruction which requires a plurality of clock signals; a prohibiting circuit for prohibiting the generation of at least the first timing clock signal when the prohibition signal is supplied thereto; and prohibition control means for controlling the application of the prohibition signal produced from said processing element to said prohibiting circuit in response to a decoded result of the field of the microinstruction on the microinstruction bus.

BRIEF DESCRIPTION OF THE DRAWINGS

Other objects and features of the present invention will be apparent from the following description taken in connection with the accompanying drawings, in which:

FIGS. 3A through 3E show timing charts of the arithmetic control unit in which FIG. 3A is a timing chart of the clock signal CLK, FIG. 3B is a timing chart showing data on the microinstruction bus 30, FIG. 3C is a timing chart of the signal EBSY, FIG. 3D is a timing chart of the signal CLK1, and FIG. 3E is a timing chart of the signal CLK2;

FIG. 5 shows a format of the microinstruction;

FIGS. 6A through 6G show timing charts of the embodiment in which FIG. 6A is a timing chart of the clock signal CLK, FIG. 6B is a timing chart of data on the microinstruction bus 30, FIG. 6C is a timing chart of the signal EBSY, FIG. 6D is a timing chart of the signal CLK1, FIG. 6E is a timing chart of the signal CLK2, FIG. 6F is a timing chart of the signal EBSY, and FIG. 6G is a timing chart of the inhibition release signal;

FIG. 7 is a block diagram showing another embodiment of the present invention; and FIGS. 8A through 8G show timing charts of the embodiment in FIG. 7 in which FIG. 8A is a timing chart of the clock signal CLK, FIG. 8B is a timing chart of data on the microinstruction bus 30, FIG. 8C is a timing chart of the signal EBSY, FIG. 8D is a timing chart of the signal CLK1, FIG. 8E is a timing chart of the signal CLK2, FIG. 8F is a timing chart of the signal EBSY1, and FIG. 8G is a timing chart of the inhibition release signal.

DETAILED DESCRIPTION OF THE PREFERRED EMBODIMENTS

Figure 1:
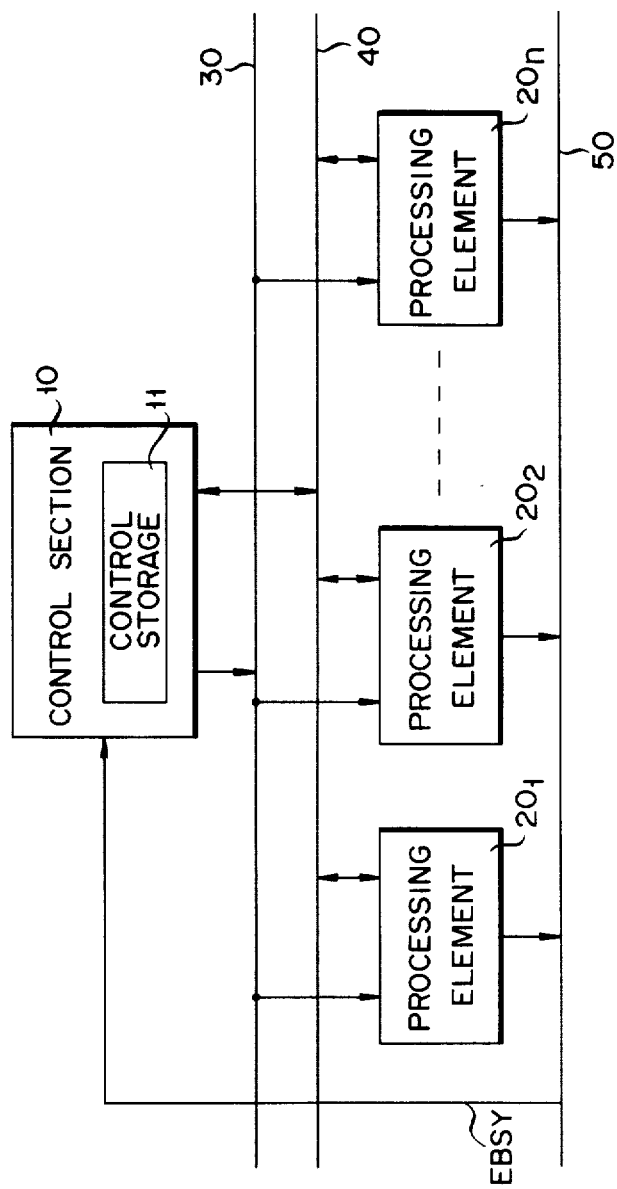
FIG. 1 is a schematic block diagram showing a conventional arithmetic control unit.

Now an embodiment of the present invention will be described referring to the drawings.

Figure 2:
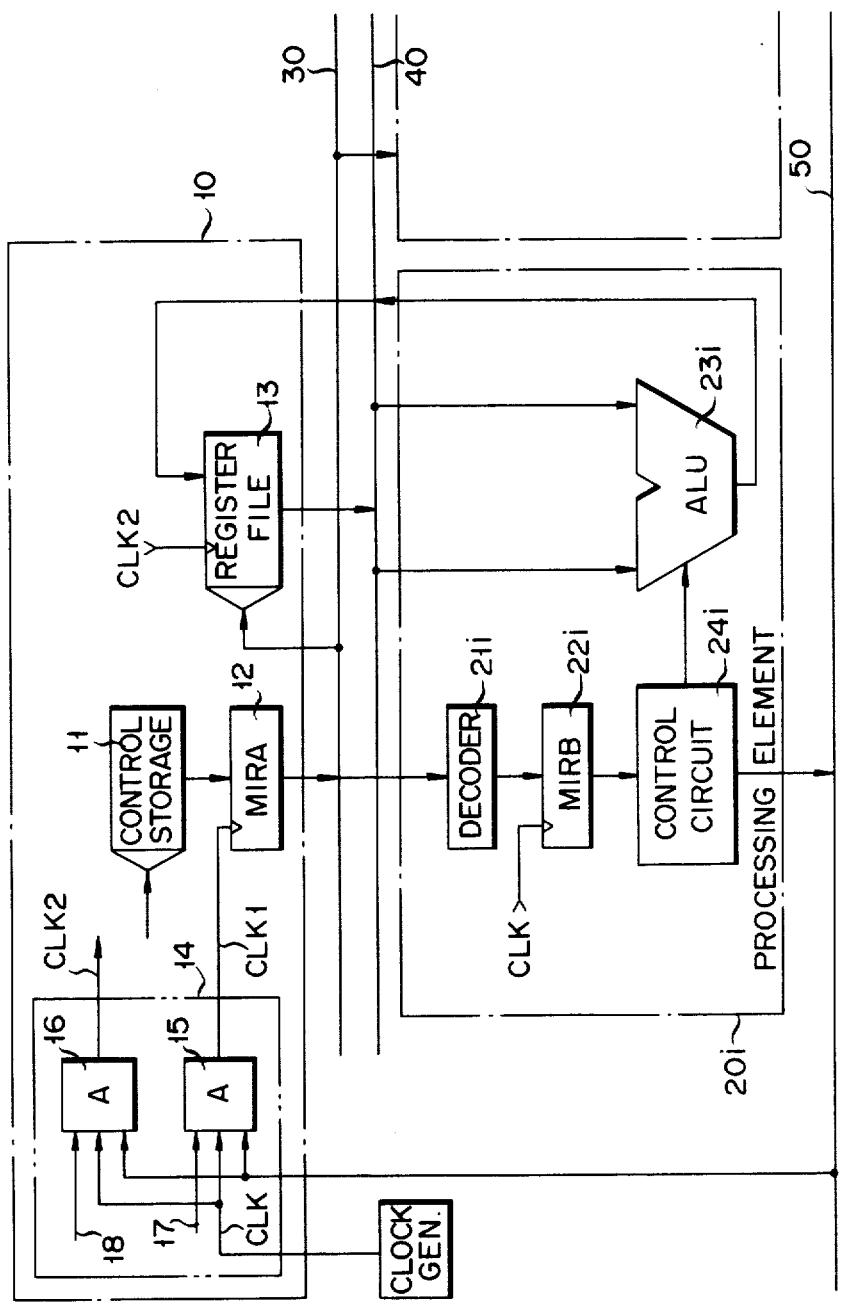
FIG. 2 is a detailed block diagram of the arithmetic control unit shown in FIG. 1.
Figure 3:
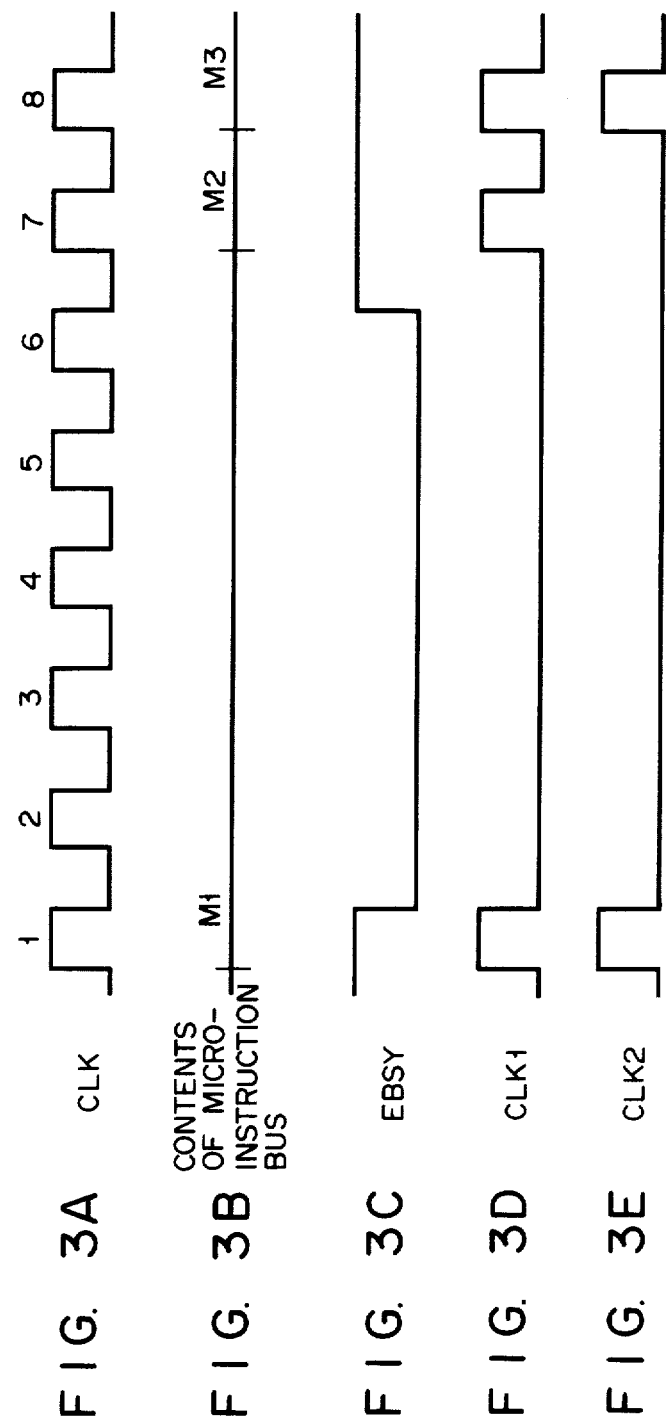
Figure 4:
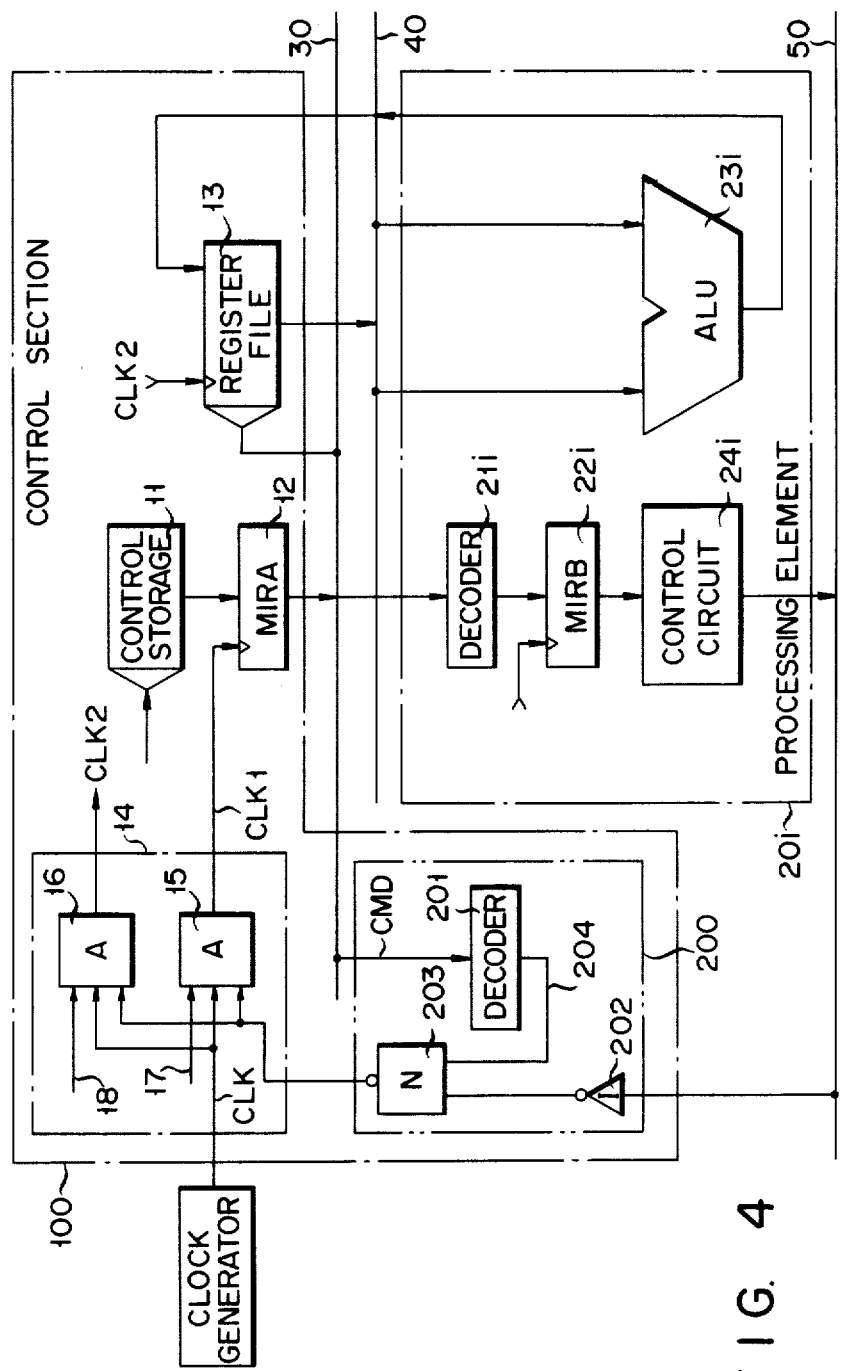
FIG. 4 is a block diagram showing an embodiment of the present invention.

The same numerals are used for the same parts in FIG. 2, and so a detailed description thereof will be omitted. In FIG. 4, the basic construction of the control section 100 is almost the same as that of the prior art control section 10 except that the control section 100 is provided with the inhibition control circuit 200 interposed between the EBSY line 50 and the inhibiting circuit 14. The inhibition control circuit 200 is provided with a decoder 201, an inverter 202 (hereinafter referred to as I) and a NAND gate 203 (hereinafter referred to as N). The decoder 201 decodes the contents of the specified field, for example a CMD field of the microinstruction on the microinstruction bus 30 and produces the effective (logic "0") inhibition release signal 204 when a busy cancel designation (which is to be described later and hereinafter referred to as BCAN designation) is performed in the CMD field. The I 202 inverts the level of the signal EBSY on the EBSY line 50. The output of the I 202 and the output of the decoder 201, that is the inhibition release signal 204 are input to the N 203. The output of the N 203 is input to the inhibiting circuit 14 as a signal EBSY1 which substitutes for the signal EBSY in FIG. 2. The same numeral $20_i$ as in FIG. 2 is used for the processing element in FIG. 4. However, it is assumed that the processing elements $20_1, 20_2, \ldots, 20_n$ are connected to the microinstruction bus 30, the data bus 40 and the EBSY line 50. Further, the processing element $20_i$ is assumed to be a representation among these processing elements $20_1$ through $20_n$.

FIG. 5 shows a partial format of the microinstruction on applied to an embodiment of the present invention. In the format, a field ES designates one of a plurality of processing elements, a field F designates the arithmetic operation mode of the designated processing element and the field R designates a register in the register file 13 in which data is stored. Further, a field R comprises a field D (destination field) for designating a register in which the operation result is stored, and B and A fields (source data fields) for designating registers in which data to be operated are stored. The CMD field is used for controlling various hardware of the system such as a set/reset control of a control flip-flop (not shown) and a read/write control of a main memory (not shown). Also, the CMD field is used for the BCAN designation.

The BCAN designation is used for disabling the effective signal EBSY output from the corresponding processing element $20_i$ (of the control circuit $24_i$) during the execution of the microinstruction which requires a plurality of clock signals.

Now the operation of the present invention will be described referring to the timing charts in FIGS. 6A through 6G. It is assumed that the microinstructions M1 through M3 on the microinstruction bus 30 are substantially the same as the microinstruction described in the prior art system. However, the microinstructions in this embodiment are different from the microinstructions in the prior art system in that the BCAN designation is performed in the CMD field of the microinstruction M1. Now suppose that the microinstruction M1 read out from the control storage 11 is stored in the MIRA 12 in accordance with the first timing clock signal CLK1 synchronized with the clock 1 of the system clock signal CLK is the same as in the prior art system. The microinstruction M1 stored in the MIRA 12 is output onto the microinstruction bus 30 as shown in the timing charts of FIGS. 6A through 6G.

The microinstruction M1 is a multiplication instruction which requires a plurality of clock signals, as is the case in the prior art system, and is processed, for example at the processing element $20_i$ ($i=1$).

When the microinstruction M1 is output onto the microinstruction bus 30, the registers of the register file 13 in which the multiplier and the multiplicand are stored are selected in accordance with the B field and the A field of the microinstruction M1. On the other hand, as in the prior art system, the DNULL designation is performed in the D field so that storage of the arithmetic operation result is prohibited.

In this embodiment, the arithmetic operation result (produced by the execution of the microinstruction M1) is stored in the register file 13 by the execution of the microinstruction M2 as in the prior art system. Further, the BCAN designation is performed in the CMD field of the microinstruction M1. The decoder within the inhibition control circuit 200 decodes the CMD field of the microinstruction on the microinstruction bus 30 and produces the effective inhibition release signal 204 of logical "0" when the BCAN designation is performed in the CMD field. Furthermore, the ES field of the microinstruction M1 designates, for example, the processing element $20_i$ ($i=1$) and the F field thereof designates the multiplication.

Figures 6A, 6B, 6C, 6D, 6E, 6F, 6G:
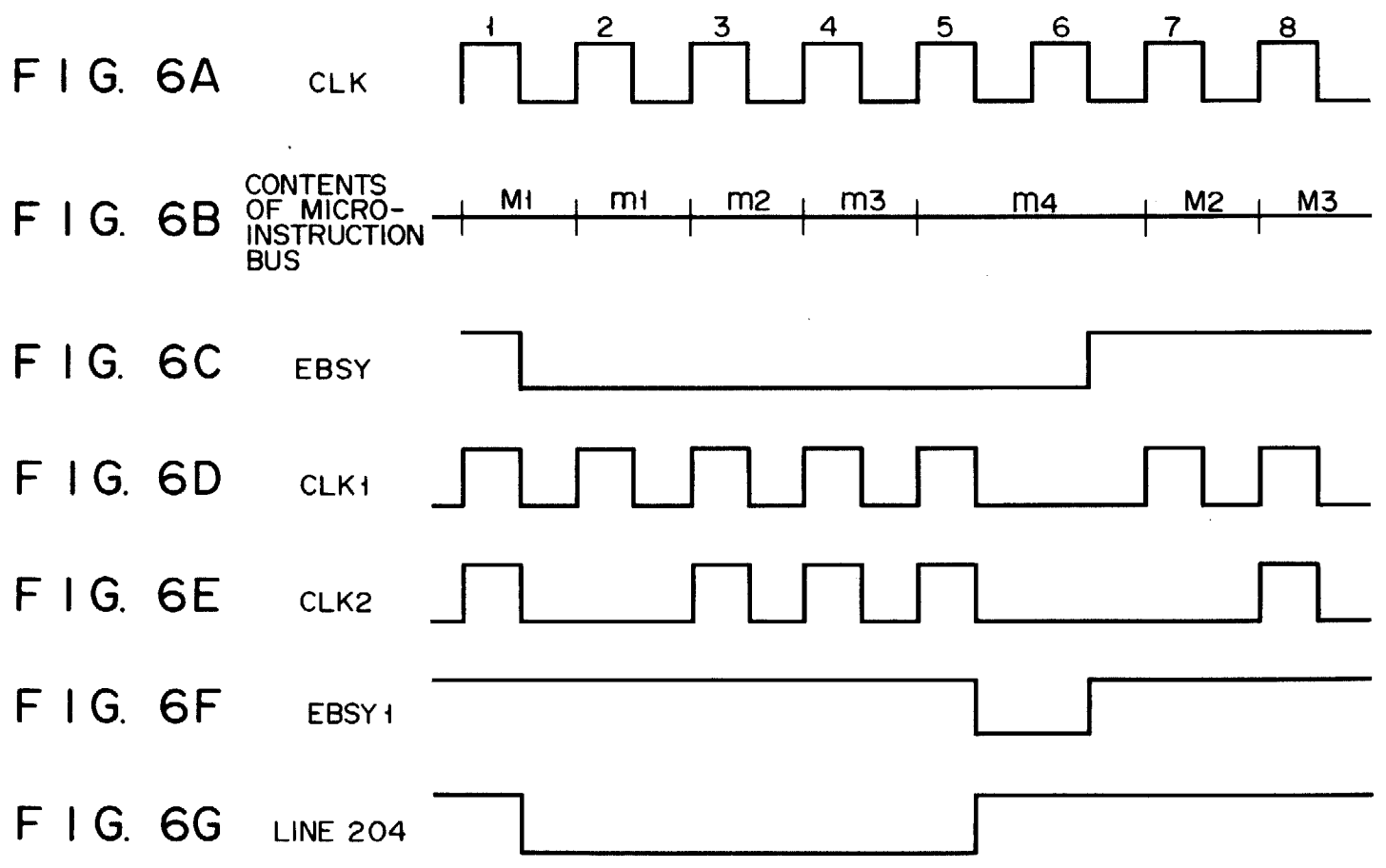

When the processing element $20_i$ ($i=1$) is designated by the ES field and is triggered, the effective signal EBSY of logical "0" is produced from the control circuit $24_i$ ($i=1$) of the processing element $20_i$ ($i=1$) as shown in FIG. 6C. The signal EBSY is input to the I 202 in the inhibition control circuit 200 through the EBSY line 50 and is inverted by the I 202 to be supplied to one input terminal of the N 203. Further, the inhibition release signal 204 which is the output of the decoder 201 is input to the other input terminal of the N 203. Where the microinstruction M1 in which the BCAN designation is performed in the CMD field is output onto the microinstruction bus 30, the inhibition release signal 204 is logical "0" (effective). Therefore, the output (signal EBSY1W1) of the N 203 becomes logical "1" independent of the output of the I 202. That is, where the BCAN designation is performed in the CMD field of the microinstruction, the application of the signal EBSY of logical "0" to the inhibition circuit 14 as the signal EBSY1 of logical "0" is prohibited even if the signal EBSY of logical "0" is produced from the processing element $20_i$ by the decoder 201 decoding the CMD field of the microinstruction. As a result, the inhibition function of the inhibiting circuit 14 is partially released and the first timing clock signal CLK1 synchronized with the system clock signal CLK is produced from the first inhibiting gate 15 at the next clock signal 2 (see FIG. 6D). Thus, the succeeding microinstruction m1 which has been read out from the control storage is stored in the MIRA 12. On the other hand, the inhibition condition of the second inhibiting gate 16 is not completely released since the signal 18 is effective (logical "0") by the DNULL designation of the microinstruction M1. Therefore, the output of the second timing clock signal CLK2 is inhibited as shown in FIG. 6E.

In this embodiment, the microinstructions m1, m2, m3, m4, M2 and M3 are sequentially stored in the control storage 11 in locations successive to that in which the microinstruction M1 is stored. The BCAN designation is performed in the individual CMD field of the microinstructions m1 through m3.

As has been described above, the microinstruction m1, stored in the MIRA 12 at the leading edge of the clock signal 2, is output onto the microinstruction bus 30 even though the signal EBSY of logical "0" is produced from the processing element $20_i$ (i=1). Therefore, the processing element $20_i$ (i=n) is selected to execute the microinstruction m1. It goes without saying that the microinstruction M1 is being executed at the processing element $20_i$ (i=1), simultaneous with the execution of the microinstruction m1. As described above, the inhibition control circuit 200 inhibits the transfer of the signal EBSY of logical "0"(as the signal EBSY1) to the inhibiting circuit 14 until the succeeding microinstruction is output onto the microinstruction bus 30 since the BCAN designation is performed in the CMD field of the microinstruction m1. As a result, the microinstruction m2 is executed at the succeeding clock signal 4 and the microinstruction m3 is executed at the clock signal 4 in the processing element $20_i$ (i=1). Furthermore, the microinstruction m4 is stored in the MIRA 12 and is output onto the microinstruction bus 30 at the leading edge of the clock signal 5. The microinstruction m4 has the same DNULL designation data as does the microinstruction M1, and is used for the adjustment of the timing signals. However, if the microinstruction m4 is the type in which it is not necessary to store the arithmetic operation result in the register file 13, such as a comparison microinstruction, the parallel operation of the microinstruction m4 and other microinstructions m1 through m3 is possible.

The BCAN designation is performed in the CMD field of the microinstruction m4. As a result, when the microinstruction m4 is output onto the microinstruction bus 30, the inhibition release signal 204, which is the output of the decoder 201 in the inhibition control circuit 200, becomes logical "1". Therefore, the effective signal EBSY of logical "0" is supplied to the inhibiting circuit 14 as the signal EBSY1 of logical "0". Thus, the outputs of the first timing clock signal CLK1 and the second timing clock signal CLK2 at the timing of the clock signal 6 are inhibited. Therefore, the execution of the succeeding instruction (in this example, microinstruction M2) of the microinstruction m4 is not performed so that adequate timing adjustment may be performed. That is, the timing adjustment can be performed in accordance with the signal EBSY without the dummy microinstructions being inserted. Then, at the timing of the clock signal 6, the processing element $20_i$ (i=1) makes the signal EBSY become logical "1" before the completion of the execution of microinstruction M1. Therefore, as shown in FIG. 6F the signal EBSY1 also becomes logical "1" and one of the inhibition conditions for the inhibiting circuit 14 is released. As a result, the first timing clock signal CLK1 is produced at the timing of the clock 7 so that the microinstruction M2 is stored in the MIRA 12.

Now another embodiment of the present invention will be described referring to FIGS. 7 and 8. FIG. 7 is a block diagram of an inhibition control circuit 300 having the same function as the inhibition control circuit 200 in the embodiment of FIG. 7. In this embodiment, in place of the description of the parts outside of the inhibition control circuit 300, the description of the block diagram of FIG. 4 may be applied by replacing the inhibition control circuit 200 in FIG. 4 with the inhibition control circuit 300. That is, this embodiment is different from the first embodiment in the internal construction of the inhibition control circuit 300. The same reference numerals are used for the same parts as in FIG. 4 for the brevity of the description. In FIG. 7, the decoder 301 decodes the contents of the CMD field of the microinstruction on the microinstruction bus 30. In this embodiment, two types of commands are specified. One is a flip-flop set designation (hereinafter referred to as an F/F set designation) and the other is a flip-flop reset designation (hereinafter referred to as an F/F reset designation). The decoder 301 outputs a set signal SET when the F/F set designation is specified in the CMD field and produces a reset signal RESET when the F/F reset designation is specified.

A flip-flop 302 (hereinafter referred to as F/F) comprises, for example a J-K flip-flop and is set, for example, at the trailing edge of the system clock CLK when a set signal SET is output from the decoder 301. Further, the F/F 302 is reset at the trailing edge of the system clock CLK when a reset signal RESET is produced from the decoder 301. The Q output of the F/F 302 (which is the same as the output of the decoder 201 in FIG. 4) is used as the inhibition release signal 204.

Suppose that the microinstruction M1, m1, m2, m3, M2 and M3 are already stored in the continuous locations of the control storage 11. Further, suppose that these microinstructions are almost the same as the microinstructions M1, m1, m2, m3, M2 and M3 in the first embodiment.

However, in this embodiment, the F/F set designation is performed in the CMD field of the microinstruction M1 and the F/F reset designation is performed in the CMD field of the-microinstruction m2. Further, in this embodiment, the BCAN designation is not performed in the CMD field and the DNULL designation is performed in the microinstruction m3.

Suppose that the microinstruction which requires a plurality of clock signals is output onto the microinstruction bus 30 at the timing of the clock signal 1 as shown in FIG. 8. The microinstruction M1 is multiplication instruction and is produced at the processing element $20_i$ (i=1) as is the case of the first embodiment. The control circuit $24_i$ (i=1) in the processing element $20_i$ (i=1) produces the effective signal EBSY of logical "0" onto the EBSY line 50 since the microinstruction requires a plurality of clock signals (see FIG. 8).

As described above, the F/F set designation is specified in the CMD field of the microinstruction. Therefore, the decoder 301 in the inhibition control circuit 300 produces the set signal SET as the result of the decoding of the CMD field of the microinstruction M1 on the microinstruction bus 30. As a result, the F/F 302 is set at the trailing edge of the succeeding clock signal 2 and produces the effective inhibition release signal 204 of logical "0" from the output terminal $\overline{Q}$. Therefore, the application of the signal EBSY of logical "0" produced from the processing element $20_i$ (i=1) to the inhibiting circuit 14 as the signal EBSY1 of logical "0" is inhibited (see FIG. 8). This condition continues until the F/F 302 is reset and the inhibition release signal 204 becomes logical "1". Therefore, the parallel operation of the microinstruction M1 and the succeeding microinstructions m1 through m3 is possible. As described above, the F/F reset designation is performed in the CMD field of the microinstruction m2. Thus, after the microinstruction m2 is output onto the microinstruction bus 30, the reset signal RESET is output as a result of the decoding of the CMD field of the microinstruction m2. Then, the F/F 302 is reset at the trailing edge of the succeeding clock signal 5. Therefore, the inhibition release signal 204 becomes logical "1" and the signal EBSY of logical "0" is supplied to the inhibiting circuit 14 as the signal EBSY1 of logical "0". Therefore, the inhibition function of the inhibiting circuit 14 operates and the fetching of the microinstruction at the timing of the clock signal 6 is prohibited. At the timing of the clock signal 5, the parallel execution of the microinstruction m3, in which the D1ULL designation is performed, and the microinstruction M1 is performed. Therefore, the microinstruction m3 is executed as the timing adjustment in which the signal EBSY becomes logical "1" and the succeeding microinstruction (in this example, the microinstruction M2) is fetched at the next clock signal.

As has been described above, according to the present invention, the parallel execution of the microinstruction M1 and the succeeding microinstruction is possible only by performing the F/F set designation in the CMD field of the microinstruction M1 without performing a particular designation (for example BCAN designation) in the CMD field of the individual microinstruction. Therefore, according to the embodiment, the CMD field which is used for the control of the individual hardware section may be utilized for the arithmetic control when the microinstruction which requires a plurality of clock signals is executed in parallel with another microinstruction.

What is claimed is:

1. a microinstruction-controlled arithmetic control unit, comprising:
   a first clock generator for generating a reference clock signal for the arithmetic control unit;
   a microinstruction register;
   a data register;
   a second clock generator, coupled to the microinstruction register and the data register, for generating a first timing clock signal for controlling the microinstruction register, and for generating a second timing clock signal for controlling the data register, the first and second timing clock signals being synchronized with the reference clock signal;
   control storage means for storing microinstructions;
   a microinstruction bus, coupled to the control storage means, for transferring the microinstructions;
   a data bus, coupled to the data register, for transferring data,
   the microinstruction register for storing the microinstruction read out from the control storage means in response to the first timing clock signal synchronized with said reference clock signal,
   the data register for storing the data on the data bus in response to the second timing clock signal synchronized with the reference clock signal;
   a plurality of processing elements, coupled to the microinstruction bus and the data bus, for performing an arithmetic operation specified by the microinstruction on the microinstruction bus and data on the data bus, and for producing an inhibition signal so as to inhibit the execution of the succeeding microinstruction during the execution of a microinstruction which requires a plurality of clock signals;
   an inhibiting circuit, coupled to the second clock generator, for inhibiting the generation of the first and second timing clock signals when the inhibition signal is supplied thereto; and
   inhibition control means, coupled to the processing elements and the microinstruction bus, for controlling the application of the inhibition signal produced from the processing elements to the inhibiting circuit in response to a decoded result of the field of the microinstruction on the microinstruction bus, wherein the inhibition signal output from a first of the processing elements is inhibited by the inhibition control means to be output to the inhibiting circuit while the microinstruction requiring a plurality of clocks is executed by the first of the processing elements, the microinstruction read out from the control storage means is latched by the microinstruction register in response to the first timing clock signal, and the latched microinstruction is output to other processing elements except the first of the processing elements.

2. A microinstruction-controlled arithmetic control unit according to claim 1, wherein said inhibition control means includes:
   a decoder, coupled to the microinstruction bus, for decoding the predetermined field of the microinstruction and for generating a first decoded signal when a first specified command is designated in the predetermined field, and a second decoded signal when a second specified command is designated in the predetermined field;
   a flip-flop, coupled to the decoder, which falls into one state in response to the first decoded signal from the decoder and which falls into the other state in response to the second decoded signal from the decoder; and
   a gate circuit, coupled to the flip-flop, for prohibiting or allowing the transfer of the inhibition signal to the inhibiting circuit in accordance with the state of said flip-flop.

3. A microinstruction-controlled arithmetic control unit according to claim 2, wherein said inhibiting circuit inhibits the generation of the first and second timing clock signals when the inhibition signal is supplied thereto.

* * * * *